Patented Feb. 20, 1934

1,948,338

UNITED STATES PATENT OFFICE

1,948,338

CATALYTIC PROCESS FOR PRODUCING GAS RICH IN HYDROGEN

Garland H. B. Davis and James A. Franceway, Baton Rouge, La., assignors to Standard Oil Development Company, a corporation of Delaware No Drawing. Application July 24, 1929
Serial No. 380,753

12 Claims. (Cl. 23—212)

The present invention relates to the production of a gas rich in free hydrogen by reaction of hydrocarbons with steam and to a catalyst which is particularly satisfactory for the process. The invention will be fully understood from the following description:

The reaction of hydrocarbons either gaseous or liquid of the paraffin series with steam to produce hydrogen and carbon monoxide is well known and a variety of catalysts have been discovered for use in the reaction. Heretofore, however, the most active catalysts have been characterized by a lack of structural strength and tendency to shrink greatly in volume after being in use for relatively short periods, so that tubes must be continually refilled to prevent channelling and consequently an imperfect contact.

The present catalyst has none of the above disadvantageous qualities and is more rugged in commercial operation. In the manufacture of this catalyst certain metallic oxides such as nickel oxide, or chromium oxide, are mixed with aluminum oxide and to the mixture phosphoric acid is added in quantity sufficient to permit the mass being worked up into a thick paste. While nickel or chromium oxide is preferred, it may be replaced in whole or in part with oxides of cobalt or manganese or iron and in the same manner the aluminum may be replaced by other refractory oxides such as an oxide of earth metals such as thorium, zirconium and thallium and other metals of the third and earth metals of the fourth group of the periodic system. Nickel and aluminum oxides are preferred and the first is preferably in proportion from about 30 to 70% by weight.

The phosphoric acid paste is baked dry for several hours at temperatures above 200° F. and preferably at about 225° F. The mass is then broken into lumps which are charged to the conversion chambers or retorts.

These catalysts may be suitably used for the production of hydrogen by passing a gas rich in hydrocarbons and steam at a reaction temperature over the catalyst disposed in a suitable reaction vessel.

As an example of the action and composition of these catalysts, the following is typical. The ingredients are powdered and mixed in the following proportions:

| | |
|---|---|
| $Al_2O_3$ | 190 pounds |
| $Ni_2O_3$ | 127 pounds |
| $H_3PO_4$ | 57 pounds—85%, $H_3PO_4$ by weight |

This mixture is kneaded into a thick paste and spread on trays or pans and heated for 20 hours at approximately 320° F. It is then packed into a tube and a mixture of refinery gas of the following composition is passed over it in admixture with steam in excess of about 187% of that required theoretically to convert the entering carbon to CO:

| | Percent |
|---|---|
| $CH_4$ | 43.1 |
| $C_2H_6$ | 16.9 |
| $C_3H_8$ | 7.7 |
| $C_4H_{10}$ | 3.5 |
| $C_5H_{12}$ | 2.4 |
| $C_2H_4$ | 5.7 |
| $C_3H_6$ | 8.0 |
| $C_4H_8$ | 5.0 |
| $H_2$ | 7.0 |
| $CO_2$ | 0.0 |
| $CO$ | 0.4 |
| $O_2$ | 0.0 |
| $N_2$ | 0.3 |
| | 100.0 |
| Total unsaturates | 18.7 |

The temperature during the conversion stage is about 1700° F., and the space velocity of inlet gas is 75 volumes per volume of catalyst per hour. The exit gas has the following compositions:

| | Percent |
|---|---|
| $CO_2$ | 8.4 |
| Unsaturates | 0.0 |
| $CO$ | 18.3 |
| $H_2$ | 72.3 |
| $CH_4$ | 0.7 |
| $C_2H_6$ | 0.0 |
| $N_2$ | 0.3 |
| | 100.0 |

The catalyst is of particular advantage when used with gases or liquid hydrocarbons containing substantial quantity of unsaturates. But it is also of considerable advantage when used with saturated liquid or gaseous hydrocarbons since it is extremely hard and structurally strong and shows little or no appreciable shrinkage with long continued use.

The present invention is not to be limited by any theory of the mechanism or action of the catalytic process nor to any specific operation which may have been given for purely illustrative purposes but only by the following claims in which it is desired to claim all novelty inherent in the process.

We claim:

1. A catalyst for the production of hydrogen from hydrocarbon and steam comprising a mixture with phosphoric acid of an oxide of a metal of an atomic weight between 52 and 59 and an oxide of a metal selected from the group consisting of the metals of group III and the earth metals of group IV of the periodic system.

2. A catalyst for the production of hydrogen from hydrocarbon and steam comprising a mixture with phosphoric acid of an oxide of a metal of an atomic weight between 52 and 59 and an oxide of a metal selected from the group consisting of aluminum, thorium, zirconium and thallium.

3. A catalyst for the production of hydrogen from hydrocarbon and steam comprising a mixture with phosphoric acid of nickel oxide and an oxide of a metal selected from the group consisting of the metals of group III and the earth metals of group IV of the periodic system.

4. A catalyst for the production of hydrogen from hydrocarbon and steam comprising a mixture with phosphoric acid of nickel oxide and aluminum oxide.

5. Catalyst according to claim 4 in which the nickel oxide is in a proportion of 30 to 70% by weight.

6. Process for the manufacture of a catalyst comprising kneading a mixture of two metal oxides, the one of a metal with an atomic weight between 52 and 59, the other of a metal selected from the group consisting of the metals of group III and the earth metals of group IV of the periodic system, with concentrated phosphoric acid and baking the mixture at a high temperature below the temperature of fusion of either oxide.

7. An improved process for producing a gas rich in free hydrogen which comprises passing a gas rich in hydrocarbons and steam at a reaction temperature over a catalyst comprised of a mixture with phosphoric acid of an oxide of a metal of an atomic weight between 52 and 59 and an oxide of a metal selected from the group consisting of the metals of group III and the earth metals of group IV of the periodic system.

8. An improved process for producing a gas rich in free hydrogen which comprises passing a gas rich in hydrocarbons and steam at a reaction temperature over a catalyst comprised of a mixture with phosphoric acid of an oxide of a metal of an atomic weight between 52 and 59 and an oxide of a metal selected from the group consisting of aluminum, thorium, zirconium and thallium.

9. An improved process for producing a gas rich in free hydrogen which comprises passing a gas rich in hydrocarbons and steam at a reaction temperature over a catalyst prepared from a mixture with phosphoric acid of nickel oxide and aluminum oxide.

10. A catalyst for the production of hydrogen from hydrocarbons and steam comprising a mixture with phosphoric acid of an oxide of a metal of an atomic weight between 52 and 59 and a refractory oxide.

11. An improved process for producing a gas rich in free hydrogen which comprises passing a gas rich in hydrocarbons and steam at a reaction temperature over a catalyst prepared from a mixture with phosphoric acid of an oxide of a metal of an atomic weight between 52 and 59 and a refractory oxide.

12. An improved process for producing a gas rich in free hydrogen which comprises passing a gas rich in hydrocarbons and steam at a reaction temperature over a catalyst comprising a mixture with phosphoric acid of nickel oxide and a refractory oxide.

GARLAND H. B. DAVIS.
JAMES A. FRANCEWAY.